US009532268B2

(12) United States Patent
Bressanelli et al.

(10) Patent No.: US 9,532,268 B2
(45) Date of Patent: Dec. 27, 2016

(54) METHODS AND APPARATUS FOR SYNCHRONIZING A USER EQUIPMENT WITH AN HFN OFFSET

(71) Applicant: QUALCOMM Incorporated, San Diego, CA (US)

(72) Inventors: Dominique Francois Bressanelli, Eschborn (DE); Saket Bathwal, Andhra Pradesh (IN); Gang Andy Xiao, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 14/547,325

(22) Filed: Nov. 19, 2014

(65) Prior Publication Data

US 2016/0142936 A1 May 19, 2016

(51) Int. Cl.
| | |
|---|---|
| *H04L 12/50* | (2006.01) |
| *H04W 28/04* | (2009.01) |
| *H04W 56/00* | (2009.01) |
| *H04W 28/06* | (2009.01) |
| *H04L 5/00* | (2006.01) |

(Continued)

(52) U.S. Cl.
CPC .............. *H04W 28/04* (2013.01); *H04L 1/22* (2013.01); *H04L 5/0055* (2013.01); *H04L 12/00* (2013.01); *H04L 12/6418* (2013.01); *H04L 29/06* (2013.01); *H04W 28/06* (2013.01); *H04W 56/001* (2013.01); *H04W 56/00* (2013.01)

(58) Field of Classification Search
CPC .......... H04W 28/04; H04L 1/22; H04L 5/0055
USPC .................................................. 370/241, 389
See application file for complete search history.

(56) References Cited

U.S. PATENT DOCUMENTS

| | | | |
|---|---|---|---|
| 8,582,768 B2 | 11/2013 | Alexander et al. | |
| 2006/0050679 A1 | 3/2006 | Jiang | |

(Continued)

FOREIGN PATENT DOCUMENTS

| | | |
|---|---|---|
| EP | 1808995 A1 | 7/2007 |
| EP | 1928130 A2 | 6/2008 |

(Continued)

OTHER PUBLICATIONS

ISA/EPO, International Search Report and Written Opinion of the International Searching Authority, Int'l Appl. No. PCT/US2014/066612, Jul. 17, 2015, European Patent Office, Rijswijk, NL, 10 pgs.

(Continued)

*Primary Examiner* — Dang Ton
(74) *Attorney, Agent, or Firm* — Holland & Hart LLP

(57) ABSTRACT

Methods, systems, and devices are described for wireless communication at a user equipment (UE). In some examples, the UE may identify an initialization and refresh (IR) packet at the radio link control (RLC) layer based the size of the IR packet, where the IR packet comprises a larger ciphered PDU size than a compressed RoHC packet. Accordingly, once the UE identifies the received packet as an IR packet, the UE may attempt to decipher the IR packet using one or more HFN offset values. In one example, the UE may determine whether the IR packet is deciphered correctly based on cyclic redundancy check (CRC) value of the deciphered IR packet. As a result, the present disclosure allows the UE to re-synchronize with the transmitting device by at least one of incrementing or decrementing an HFN value at the receiving device.

30 Claims, 12 Drawing Sheets

(51) Int. Cl.
*H04L 1/22* (2006.01)
*H04L 12/00* (2006.01)
*H04L 29/06* (2006.01)
*H04L 12/64* (2006.01)

(56) References Cited

U.S. PATENT DOCUMENTS

2008/0123655 A1   5/2008  Kim et al.
2012/0308009 A1  12/2012  Venkatsuresh et al.

FOREIGN PATENT DOCUMENTS

EP       2785091 A1   10/2014
JP     2006217100 A    8/2006
JP     2010199750 A    9/2010

OTHER PUBLICATIONS

IPEA/EP, Second Written Opinion of the International Preliminary Examining Authority, Int'l Application No, PCT/US2014/066612, Nov. 20, 2014, European Patent Office, Rijswijk, NL, 7 pgs.

METHODS AND APPARATUS FOR SYNCHRONIZING A USER EQUIPMENT WITH AN HFN OFFSET

BACKGROUND

Field of Disclosure

The following relates generally to wireless communication, and more specifically to methods and apparatus for synchronizing a user equipment (UE) with an HFN offset.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as UEs. A base station may communicate with the communication devices on downlink channels (e.g., for transmissions from a base station to a UE) and uplink channels (e.g., for transmissions from a UE to a base station).

However, in some examples, a number of frames or protocol data units (PDUs) may be dropped during communication between the base station and the UE (e.g., due to poor channel conditions). Transmission failure of one or more consecutive PDUs may result in de-synchronization between the base station and the UE. In some examples, de-synchronization between the base station and the UE may affect the UE's ability to properly decipher or decompress data from the base station. Improved methods of communication between the base station and the UE are desired.

SUMMARY

Systems, methods, and apparatuses for re-synchronizing a UE with the base station are disclosed. In accordance with aspects of the present disclosure, the UE may detect a threshold number of consecutive failures to decipher a compressed robust header compression (RoHC) packet using a hyper frame number (HFN) stored at the UE. In aspects, upon detecting the consecutive failures, the UE may transmit an indication of the failure to the transmitting device, where the indication may comprise a negative acknowledgment (NAK) message. In aspects, in response to receiving the NAK message, the transmitting device may transmit a RoHC initialization and refresh (IR) packet to the UE.

In accordance with the present disclosure, the UE may identify the IR packet at the radio link control (RLC) layer based on the size of the IR packet. For instance, the UE may identify the IR packet because the IR packet may include a larger PDU size than the compressed RoHC packet. In one or more examples of the present disclosure, the UE, upon identifying the received IR packet, may decode the received packet using one or more HFN offset values. In some examples, the HFN offset values may be at least one of HFN+i or HFN−i values, where "i" may be an integer (e.g., i=1, i=2, etc.). As a result, the present disclosure allows the UE to re-synchronize with the transmitting device by at least one of incrementing or decrementing the HFN values at the receiving device.

A method of wireless communication at a UE is described. The method may include receiving, at a first wireless device, an RoHC initialization and refresh (IR) packet from a second wireless device, identifying the IR packet at an RLC layer of the first wireless device based on a size of the IR packet, and deciphering the IR packet using a hyper frame number offset in response to the identification of the IR packet.

An apparatus for wireless communication at a UE is described. The apparatus may include means for receiving, at a first wireless device, an RoHC initialization and refresh (IR) packet from a second wireless device, means for identifying the IR packet at an RLC layer of the first wireless device based on a size of the IR packet, and means for deciphering the IR packet using a hyper frame number offset in response to the identification of the IR packet.

A further apparatus for wireless communication at a UE is described. The apparatus may include a processor, memory in electronic communication with the processor, and instructions stored in the memory, wherein the instructions are executable by the processor to receive, at a first wireless device, an RoHC initialization and refresh (IR) packet from a second wireless device, identify the IR packet at an RLC layer of the first wireless device based on a size of the IR packet, and decipher the IR packet using a hyper frame number offset in response to the identification of the IR packet.

A non-transitory computer-readable medium storing code for wireless communication at a UE is described. The code may include instructions executable to receive, at a first wireless device, an RoHC initialization and refresh (IR) packet from a second wireless device, identify the IR packet at an RLC layer of the first wireless device based on a size of the IR packet, and decipher the IR packet using a hyper frame number offset in response to the identification of the IR packet.

In some examples of the method, apparatuses, or non-transitory computer-readable medium described above, identifying the IR packet based on the size comprises determining that the received IR packet comprises a larger ciphered protocol data unit (PDU) size than a compressed RoHC packet. Additionally or alternatively, some examples may include determining that the IR packet is deciphered correctly based on a CRC value of the deciphered IR packet.

Some examples of the method, apparatuses, or non-transitory computer-readable medium described above may further include detecting a failure to decipher the IR packet correctly using the hyper frame number offset. Additionally or alternatively, some examples may include incrementing a value of the hyper frame number offset based on the detected failure.

Some examples of the method, apparatuses, or non-transitory computer-readable medium described above may further include decrementing a value of the hyper frame number offset based on the detected failure. Additionally or alternatively, some examples may include triggering a radio link failure based on the detected failure.

Some examples of the method, apparatuses, or non-transitory computer-readable medium described above may further include synchronizing the first wireless device with the second wireless device based on a success in deciphering the IR packet using the hyper frame number offset. Additionally or alternatively, some examples may include detecting a threshold number of consecutive failures to decipher a compressed RoHC packet using a current hyper frame number stored by the first wireless device.

Some examples of the method, apparatuses, or non-transitory computer-readable medium described above may further include transmitting an indication of the consecutive failures to the second wireless device. Additionally or alternatively, in some examples the indication transmitted to the second wireless device comprises a negative acknowledgment message.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
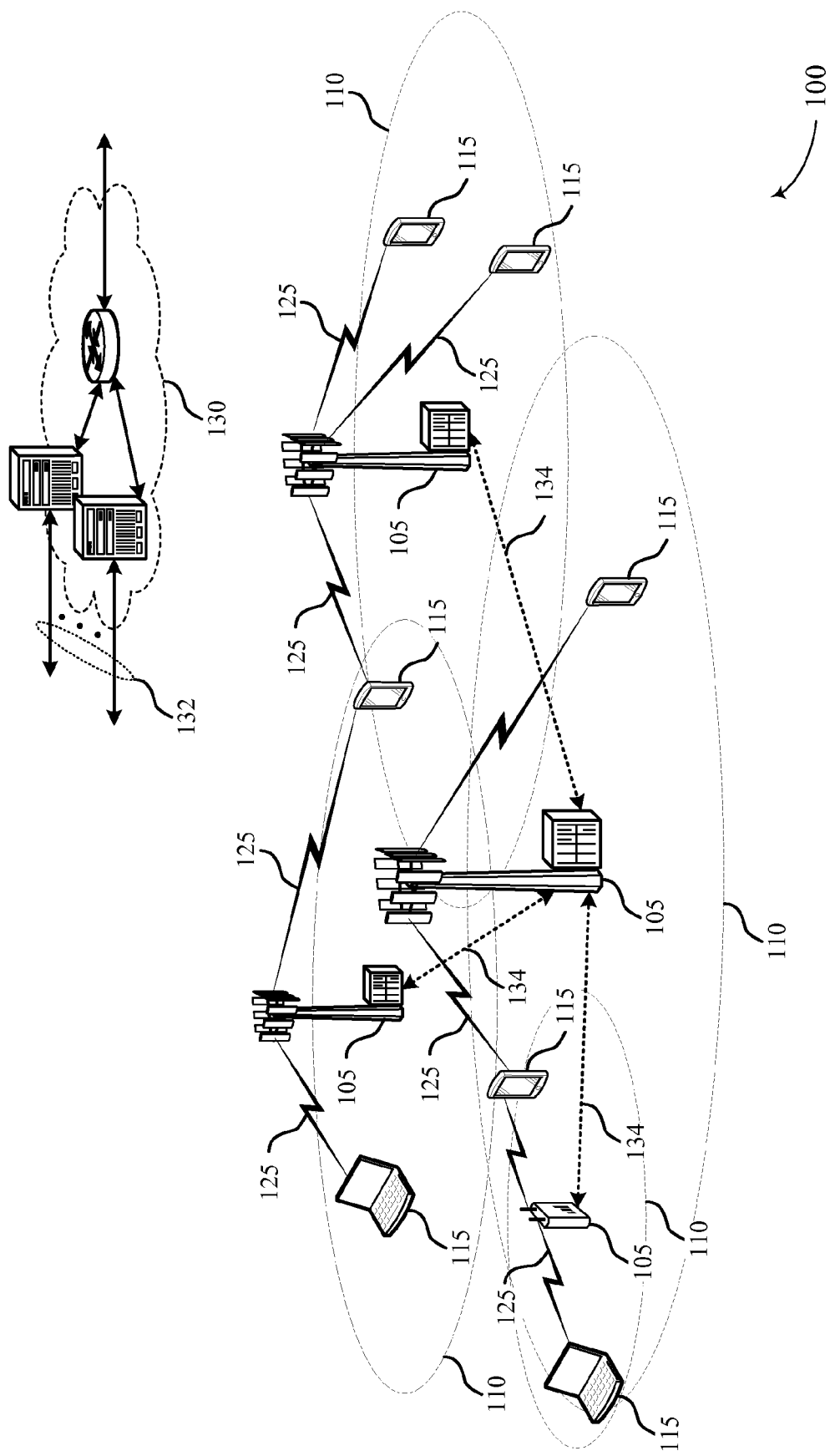
FIG. 1 illustrates an example of a wireless communications system for synchronizing a user equipment (UE) with an HFN offset in accordance with various aspects of the present disclosure.

The described features generally relate to improved systems, methods, or apparatuses for synchronizing a UE utilizing one or more HFN offset values. Data communication between a transmitting device (e.g., base station) device and a receiving device (e.g., mobile device) in a radio link control (RLC) layer may require strict synchronization to ensure that the process of encryption and decryption operate smoothly. At the RLC layer, ciphering and deciphering may be performed on transmitted packets by utilizing a time-varying parameter value or count, which may be a combination of a short sequence number (SN) and a hyper frame number (HFN) that is incremented at each RLC SN cycle. Accordingly, when a SN value exceeds the maximum value (e.g., 127), the SN may be wrapped around to its initial value 0 and the HFN may be incremented by 1. In some examples, the SN value may be signaled between the transmitting device and the receiving device during the transmission of each packet. In contrast, the HFN value may be tracked separately by each of the transmitting and receiving devices (e.g., not signaled by the transmitting device to the receiving device).

In some examples, a number of frames or PDUs may be dropped between the transmitting device and the receiving device (e.g., due to poor transmission channel conditions). As a result, the transmission of these frames may cause the HFN value to rollover at the transmitting device. However, because the receiving device may not receive the dropped frames, the HFN value at the receiving device may not be incremented properly, resulting in a de-synchronization between the transmitting device and the receiving device. This de-synchronization may result in a failure by the receiving device to decipher and/or decompress data from the transmitting device. For example, if the receiving device misses more than 64 consecutive PDUs, the receiving device may not be aware of the missed PDUs, and thus the HFN at the receiving device may not be incremented. Thereafter, even if further PDUs are transmitted and received correctly, the data in the received PDUs may be erroneously deciphered at the receiving device due to the de-synchronization between the HFNs at the transmitting device and the receiving device.

In accordance with the present disclosure, the receiving device may break the deciphering deadlock when the HFN of the receiving device may be out of synch with the HFN of a transmitting device. Specifically, in accordance with the present disclosure, the receiving device may, upon detecting a threshold number of consecutive failures to decipher a compressed robust header compression (RoHC) packet using a current HFN stored by the receiving device, transmit an indication of the consecutive failures to the transmitting device. In some examples, the indication may be a negative acknowledgment (NAK) message. In response, the transmitting device may transmit a RoHC initialization and refresh (IR) packet that carries full header information without packet compression.

In some examples of the present disclosure, the receiving device may identify the IR packet at a radio link control (RLC) layer of the receiving device based on a size of the IR packet. Specifically, the receiving device may determine that the IR packet comprises a larger ciphered PDU size than a compressed RoHC packet. Accordingly, the receiving device may attempt to decipher or decompress the received IR packet using an HFN offset value. In some examples, the HFN offset value may be HFN+i or HFN−i values, where "i" may be an integer (e.g., i=1, i=2, etc.). As a result, the receiving device may attempt to re-synchronize with the transmitting device by incrementing or decrementing the HFN values at the receiving device. In one example, the receiving device may determine whether the IR packet is deciphered correctly or not based on cyclic redundancy check (CRC) value of the deciphered IR packet.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base station 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In accordance with the present disclosure, data communication between the base station 105 and the UE 115 in RLC may require strict synchronization to ensure that the UE 115 can decrypt received data properly. For example, for establishing voice communication, it may be critical that the communication between the base station 105 and the UE 115 remain synchronized. However, as discussed above, at times, a number of frames or PDUs between the base station 105 and the UE 115 may not be transmitted successfully due to poor channel conditions, for example. In such instances, unsuccessful transmission of frames may cause the HFN to rollover at the base station 105 but not at the UE 115, resulting in de-synchronization between the base station 105 and the UE 115. De-synchronization may further result in a failure by the UE 115 to decipher or decompress data from the base station 105. For example, if the UE 115 misses more than 64 consecutive PDUs, the UE 115 may not be aware of the missed PDUs, and thus may not increment the HFN at the UE 115 to maintain synchronized with the base station 105. As a result, even if further PDUs are transmitted and received correctly between the base station 105 and the UE 115, the data in the received PDUs may be deciphered incorrectly due to the de-synchronization between the HFN values at the base station 105 and the UE 115.

In accordance with the present disclosure, the UE 115 may detect de-synchronization upon experiencing a threshold number of consecutive failures to decipher a compressed RoHC packet using HFN stored at the UE 115. Upon detecting consecutive failures to decipher a compressed RoHC packet, the UE 115 may transmit a message to the base station 105 indicating de-synchronization. In some examples, the message may comprise a NAK. In response to receiving the NAK message from the UE 115, the base station 105 may transmit an IR packet to the UE 115. The IR packet may carry full header information, including the payload without significant packet compression to assist the UE 115 to re-synchronize with the base station 105.

Wireless communications system 100 may include an RLC layer that connects higher layers (e.g., RRC and PDCP) to the lower layers (e.g., the MAC layer). An RLC entity in a base station 105 or a UE 115 may ensure that transmission packets are organized into appropriately sized blocks (corresponding to the MAC layer transport block size). If an incoming data packet (e.g., a PDCP or RRC service data unit (SDU)) is too big for transmission, the RLC layer may segment it into several smaller RLC protocol data unit (PDUs). If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, the transmitter may send a Poll Request to determine which PDUs have been received and the receiver may respond with a Status Report. Unlike the MAC layer HARQ, RLC automatic repeat request (ARQ) may not include a forward error correction function. An RLC entity may operate in one of three modes. In acknowledged mode (AM), unacknowledged mode (UM) and TM. In AM, the RLC entity may perform segmentation/concatenation and ARQ. This mode may be appropriate for delay tolerant or error sensitive transmissions. In UM, the RLC entity may perform segmentation or concatenation but not ARQ. This may be appropriate for delay sensitive or error tolerant traffic (e.g., voice over Long Term evolution (VoLTE)). Transparent mode (TM) may perform data buffering without concatenation/ segmentation or ARQ. TM may be used primarily for sending broadcast control information (e.g., the master information block (MIB) and system information block (SIBs)), paging messages, and RRC connection messages. Some transmissions may be sent without RLC (e.g., a random access channel (RACH) preamble and response).

In accordance with the present disclosure, the UE 115 may identify received PDUs based on the size of the PDU packets. In one example, the UE 115 may identify a received PDU as an IR packet based on a determination that the received IR packet comprises a larger ciphered PDU size than a compressed RoHC packet. Accordingly, the UE 115 may decipher the IR packet using HFN offset in response to identification of the IR packet. In some examples of the present disclosure, the UE 115 may determine whether the IR packet is deciphered correctly based on a CRC value of the deciphered IR packet. In the event that the UE 115 detects a failure to decipher the IR packet using the HFN offset, the UE 115 may increment or decrement a value of the HFN offset based on the detected failure.

In some cases, a UE 115 may determine that a radio link has failed and initiate a radio link failure (RLF) procedure. For example, an RLF procedure may be triggered upon an RLC indication that a maximum number of retransmissions has been reached, upon receiving a maximum number of out-of-sync indications, or upon radio failure during a RACH procedure. In some cases (e.g., after reaching the limit for out-of-sync indications) a UE 115 may initiate a timer and wait to determine whether a threshold number of in-sync indications are received. If the number of in-sync indications exceeds the threshold prior to expiration of the timer, the UE 115 may abort the RLF procedure. Otherwise, the UE 115 may perform a RACH procedure to regain access to network. The RACH procedure may include transmitting an RRC connection re-establishment request including the cell radio network temporary identity (C-RNTI), the cell identification (ID), security verification information, and a cause for re-establishment. The base station 105 receiving the request may respond with either an RRC connection re-establishment message or an RRC connection re-establishment rejection. The RRC connection re-establishment message may include parameters for establishing a signaling radio bearer (SRB) for the UE 115 as well as information for generating a security key. Once the UE 115 receives the RRC connection establishment message it may implement the new SRB configuration and transmit an RRC connection re-establishment complete message to the base station 105.

In some cases LTE networks may be designed for transfer of data packets, and may use a circuit switched fall back for voice communications. However, an LTE network may also be used for voice communications using a packet based system similar to voice over internet protocol (VoIP) applications. This may be accomplished using VoLTE technology. There may be several key differences between VoLTE and VoIP. For example, VoLTE service may include an explicit quality of service (QoS) target. To achieve the QoS threshold in poor radio conditions, VoLTE packets may utilize internet protocol multimedia subsystem (IMS) and other network features to ensure low latency and improved error correction.

Figure 2:
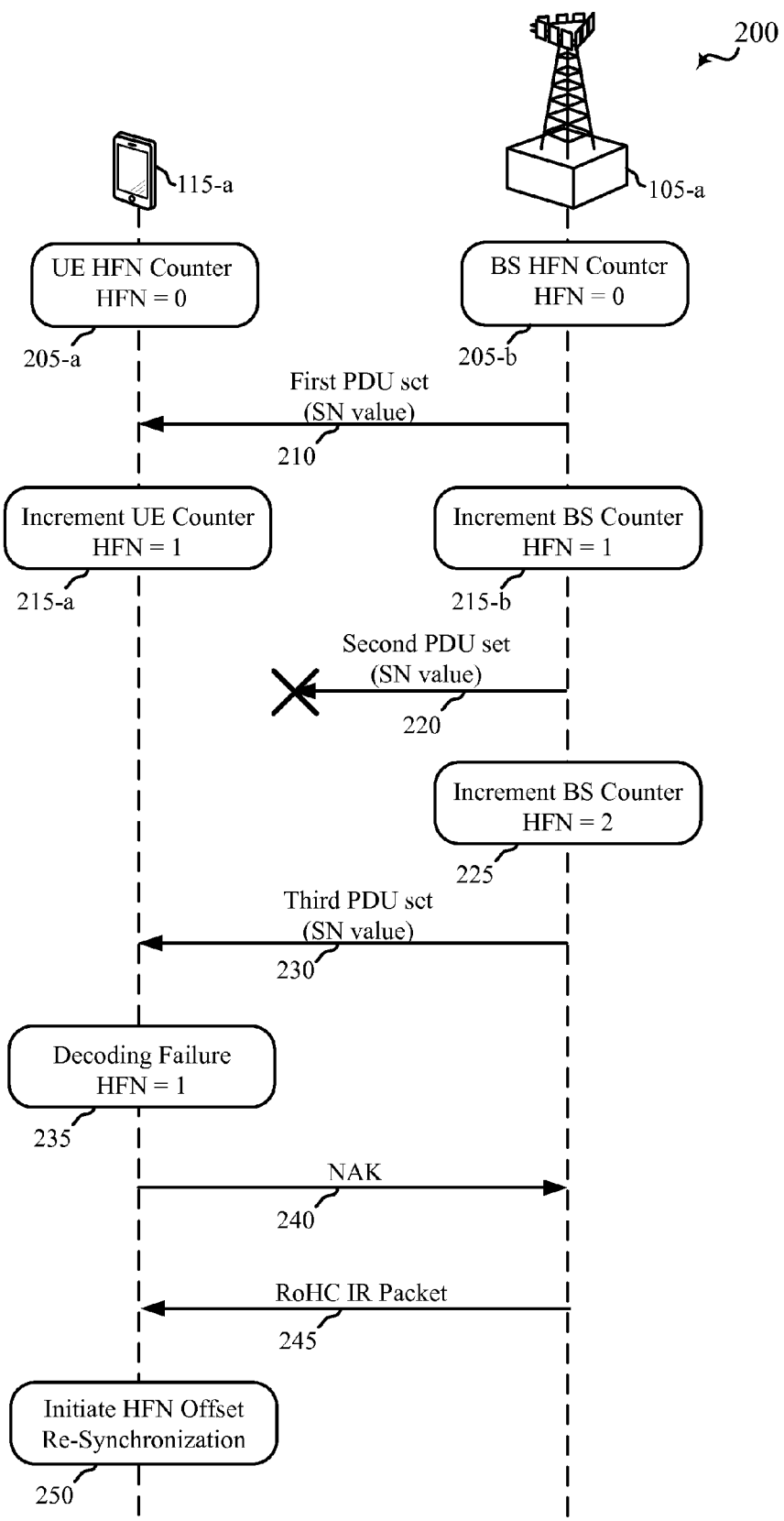
FIG. 2 illustrates an example of a flow diagram for synchronizing a UE with an HFN offset in accordance with various aspects of the present disclosure.

FIG. 2 illustrates an example of a wireless communications subsystem 200 for synchronizing a UE with an HFN offset in accordance with various aspects of the present disclosure. Wireless communications subsystem 200 may include a UE 115-a, which may be an example of a UE 115 described above with reference to FIG. 1. Wireless communications subsystem 200 may also include a base station 105-a, which may be an example of a base station 105 described above with reference to FIG. 1.

In accordance with the present disclosure, the UE 115-a and the base station 105-a may establish communication to exchange data (e.g., voice packets over LTE). In PDCP, ciphering and deciphering of packets may be performed by utilizing a time-varying parameter value or count, which may be a combination of a short sequence number (SN) and a hyper frame number (HFN) that is incremented at each PDCPSN cycle. Accordingly, when a SN value exceeds a maximum value (e.g., 127), the SN may be wrapped around to its initial value (e.g., zero) and the HFN may be incremented sequentially. In some examples of the present disclosure, the UE 115-a may have to decrypt the received PDUs using an HFN utilized by the base station 105-a to encrypt the transmitted packet.

In one example, the UE 115-a and the base station 105-a may independently maintain the HFN counter 205. The SN value may be signaled with each associated PDU transmitted by the base station 105-a. In the illustrated example, the HFN counter may initiate at zero for both the UE HFN counter 205-a and the base station (BS) HFN counter 205-b. During a first time period, the base station 105-a may transmit a first set of PDUs 210 to the UE 115-a. Each transmitted PDU may correspond with a SN value (e.g., 0-127) that may allow the UE 115-a to determine the order of packets received from the base station 105-a. When a SN value exceeds a maximum value (e.g., 127), the SN may be wrapped to value zero and the UE 115-a may increment the UE HFN counter 215-a. Similarly, the base station 105-a may maintain a separate HFN counter that may be incremented 215-b to reflect the current HFN value.

In some examples, the base station 105-a may transmit a second set of PDU(s) 220 to the UE 115-a during a second time period. However, in one example, the transmitted set of PDU(s) 220 may fail to reach the UE 115-a due to poor channel conditions. As a result, transmission of the second set of PDU(s) 220 may cause the base station 105-a to rollover the BS HFN counter 225, but not the UE HFN counter, resulting in a de-synchronization between the UE 115-a and the base station 105-a. Subsequently, when the base station 105-a transmits a third set PDU(s) 230 encrypted using the updated HFN value to the UE 115-a, the UE 115-a may not be aware of the missed second set of PDU(s). Thus, in some examples, the UE 115-a may attempt to decipher the third set of PDU(s) utilizing a stale HFN value (e.g., HFN=1) resulting in decoding failure 235. In one example, the UE 115-a may determine whether the received packet is deciphered correctly based on a CRC value of the deciphered packet. Additionally or alternatively, the UE 115-a may attempt to decipher the received PDU set 230 for a predetermined number of times prior to transmitting a negative acknowledgment (NAK) message 240 to the base station 105-a.

Upon receiving the NAK message 240, the base station 105-a may transmit a RoHC IR packet 245 that carries data packets without packet compression. Based in part on the received RoHC IR packet 245, the UE 115-a may initiate adaptive HFN offset re-synchronization procedure 250 that is described in detail with reference to FIG. 3.

Figure 3:
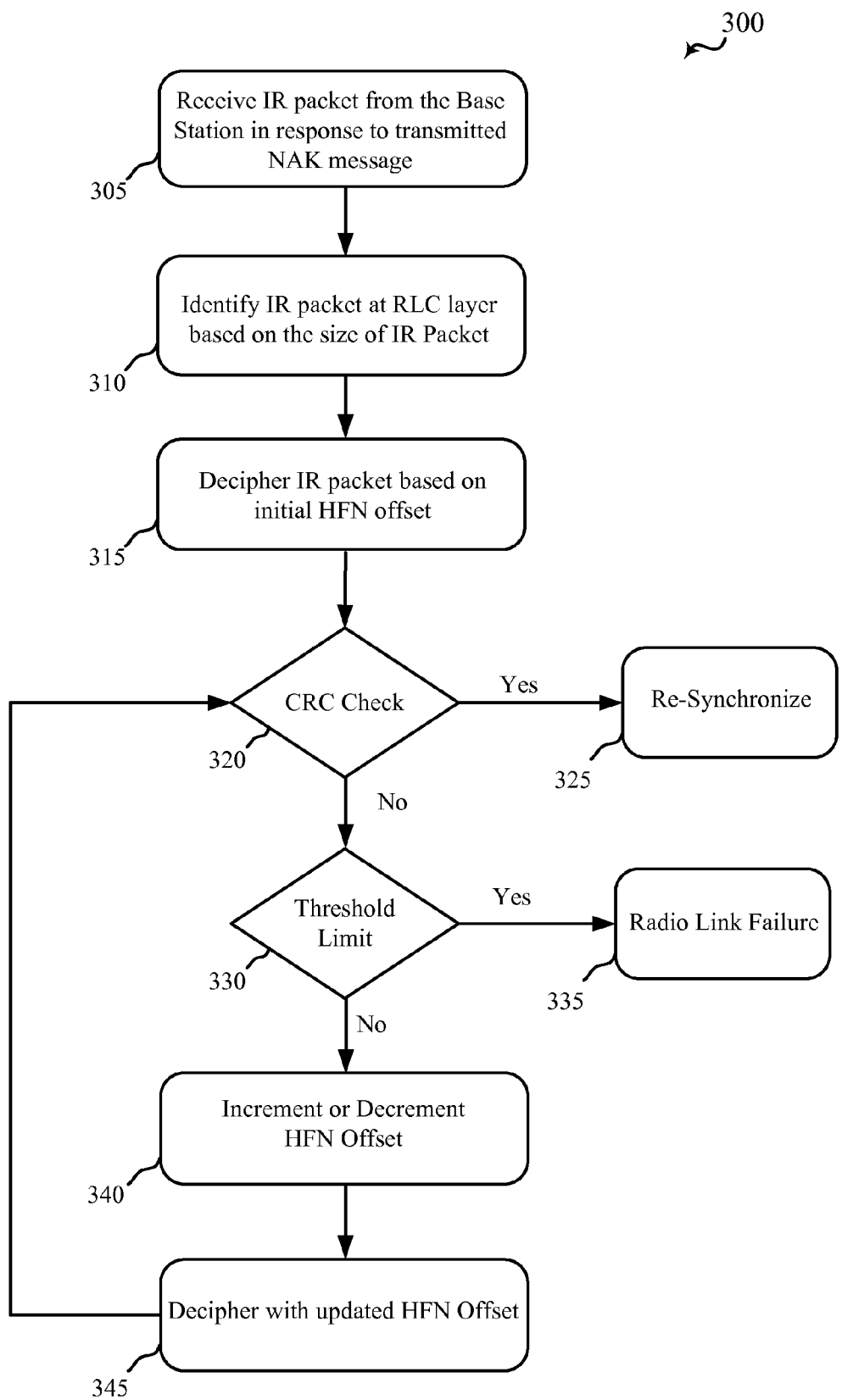
FIG. 3 illustrates a flowchart for synchronizing the UE with an HFN offset in accordance with various aspects of the present disclosure.

FIG. 3 is a flowchart illustrating a method 300 for synchronizing a UE with an HFN offset in accordance with various aspects of the present disclosure. The operations of method 300 may be implemented by a UE 115 or its components as described with reference to FIGS. 1-2. In some examples, a UE 115 may execute a set of codes to control the functional elements of the UE 115 to perform the functions described below. Additionally or alternatively, the UE 115 may perform aspects the functions described below using special-purpose hardware.

In accordance with the present disclosure, the UE 115, at block 305, may receive RoHC IR packet from the base station 105 in response to the transmitted NAK message. At block 310, the UE 115 may identify the IR packet at the RLC layer based on the size of the packet. In aspects, the UE 115 may identify the IR packet at another layer. In one example, the UE 115 may determine that the received IR packet comprises a larger ciphered PDU size than a compressed RoHC packet.

Additionally or alternatively, the UE 115, at block 315, may decipher the IR packet based on an initial HFN offset value. In some examples, the HFN offset value may refer to one or more of HFN+i or HFN−i values or a subset thereof, where "i" may be an integer (e.g., i=1, i=2, etc.). In one example, the initial HFN offset value may be one (e.g., HFN=1). At block 320, the UE 115 may determine whether the deciphered IR packet is deciphered correctly by performing a cyclic redundancy check (CRC) on the deciphered IR packet. If, at block 320, the UE 115 determines that the initial HFN offset value yields a correct CRC, the method 300 may proceed to block 325 to identify that the UE 115 and the base station 105 are re-synchronized. However, in the event that the UE 115 detects a failure to decipher the IR packet correctly using the initial HFN offset, the UE 115, at block 330, may first determine whether a threshold number of reattempts (e.g., three consecutive attempts) has been reached. In some examples, the threshold may be dynamically adjusted based on the type of data transmitted between the base station 105 and the UE 115. If the threshold for attempting to decipher the received IR packet has reached, the UE 115 may trigger a radio link failure at block 335 and begin the process of reestablishing communication with the base station 105. In aspects, a single failure to decipher the IR packet correctly using the initial HFN offset may trigger a radio link failure.

However, if the reattempt threshold has not been reached, the UE 115, at block 340, may either increment or decrement the value of the HFN offset based on the detected CRC failure. At block 345, the UE 115 may attempt to decipher the received IR packet with the updated HFN offset value and again determine whether the IR packet is deciphered correctly based on the CRC value of the deciphered IR packet.

Figure 4:
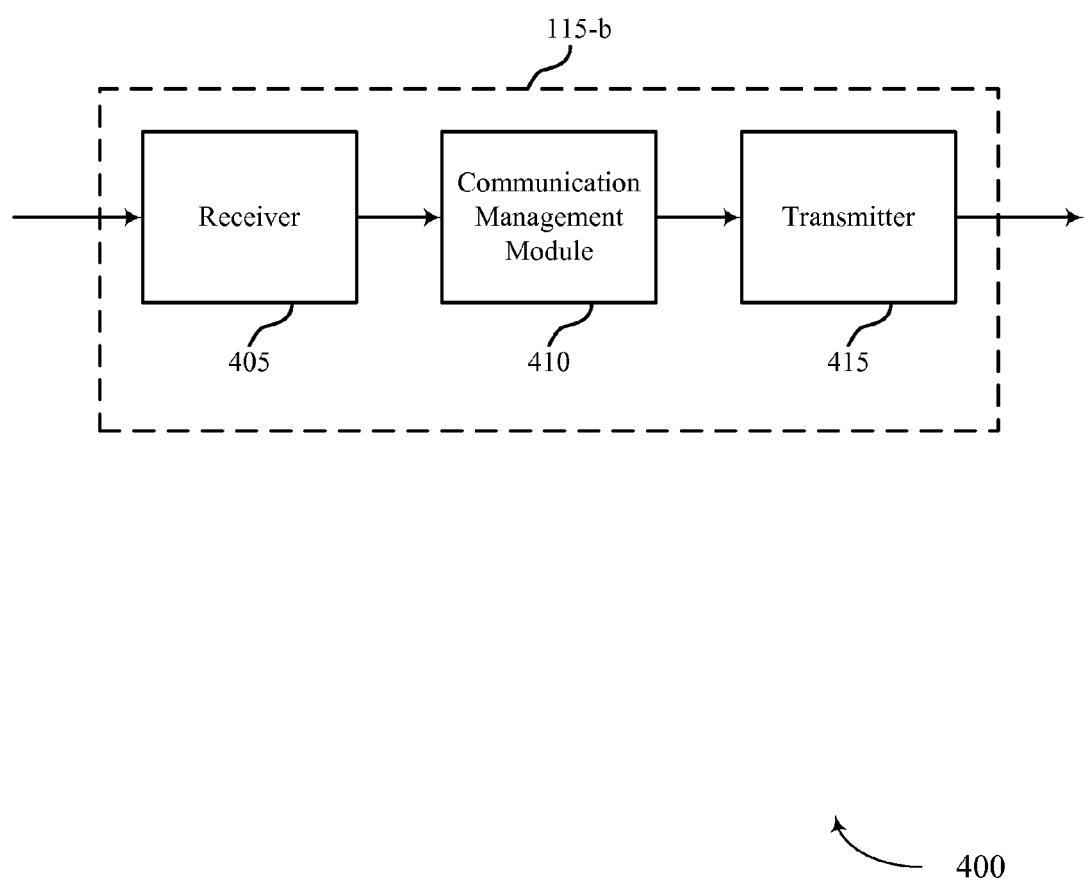
FIG. 4 shows a block diagram of a UE configured for synchronizing the UE with an HFN offset in accordance with various aspects of the present disclosure.

FIG. 4 shows a block diagram 400 of a UE 115-b configured for synchronizing a UE with an HFN offset in accordance with various aspects of the present disclosure. UE 115-b may be an example of aspects of a UE 115 described with reference to FIGS. 1-3. UE 115-b may include a receiver 405, a communication management module 410, or a transmitter 415. UE 115-b may also include a processor. Each of these components may be in communication with each other.

The components of UE 115-b may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 405 may receive information such as packets, user data, or control information associated with various information channels (e.g., control channels, data channels, and information related to synchronizing a UE with an HFN offset, etc.). Information may be passed on to the communication management module 410, and to other components of UE 115-c.

The communication management module 410 may receive, at a first wireless device, an RoHC initialization and refresh (IR) packet from a second wireless device, identify the IR packet at an RLC layer of the first wireless device based on a size of the IR packet, and decipher the IR packet using a hyper frame number offset in response to the identification of the IR packet, for example, at the PDCP layer.

The transmitter 415 may transmit signals received from other components of UE 115-c. In some embodiments, the transmitter 415 may be collocated with the receiver 405 in a transceiver module. The transmitter 415 may include a single antenna, or it may include a plurality of antennas.

Figure 5:
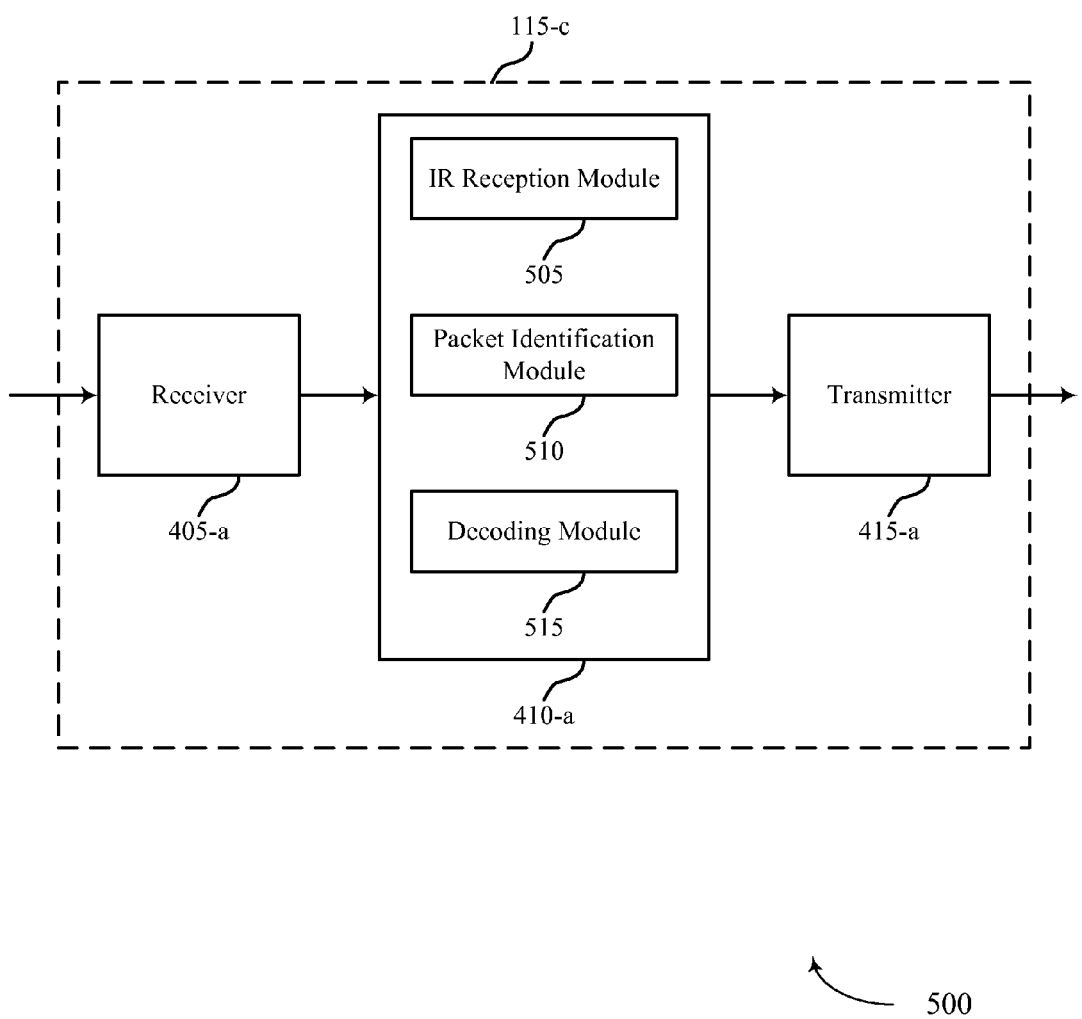
FIG. 5 shows another block diagram of a UE configured for synchronizing the UE with an HFN offset in accordance with various aspects of the present disclosure.

FIG. 5 shows a block diagram 500 of a UE 115-c for synchronizing a UE with an HFN offset in accordance with various aspects of the present disclosure. UE 115-c may be an example of aspects of a UE 115 described with reference to FIGS. 1-4. UE 115-c may include a receiver 405-a, a communication management module 410-a, or a transmitter 415-a. UE 115-c may also include a processor. Each of these components may be in communication with each other. The communication management module 410-a may also include an IR reception module 505, a packet identification module 510, and a decoding module 515.

The components of UE 115-c may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 405-a may receive information which may be passed on to communication management module 410-a, and to other components of UE 115-d. The communication management module 410-a may perform the operations described above with reference to FIG. 4. The transmitter 415-a may transmit signals received from other components of UE 115-d.

The IR reception module 505 may receive, at a first wireless device, an RoHC initialization and refresh (IR) packet from a second wireless device as described above with reference to FIGS. 2-3.

The packet identification module 510 may identify the IR packet at an RLC layer of the first wireless device based on a size of the IR packet as described above with reference to FIGS. 2-3. In aspects, the packet identification module 510 may identify the IR packet at another layer. In some examples, identifying the IR packet based on the size comprises determining that the received IR packet comprises a larger ciphered PDU size than a compressed RoHC packet.

The decoding module 515 may decipher the IR packet using a hyper frame number offset in response to the identification of the IR packet as described above with reference to FIGS. 2-3.

Figure 6:
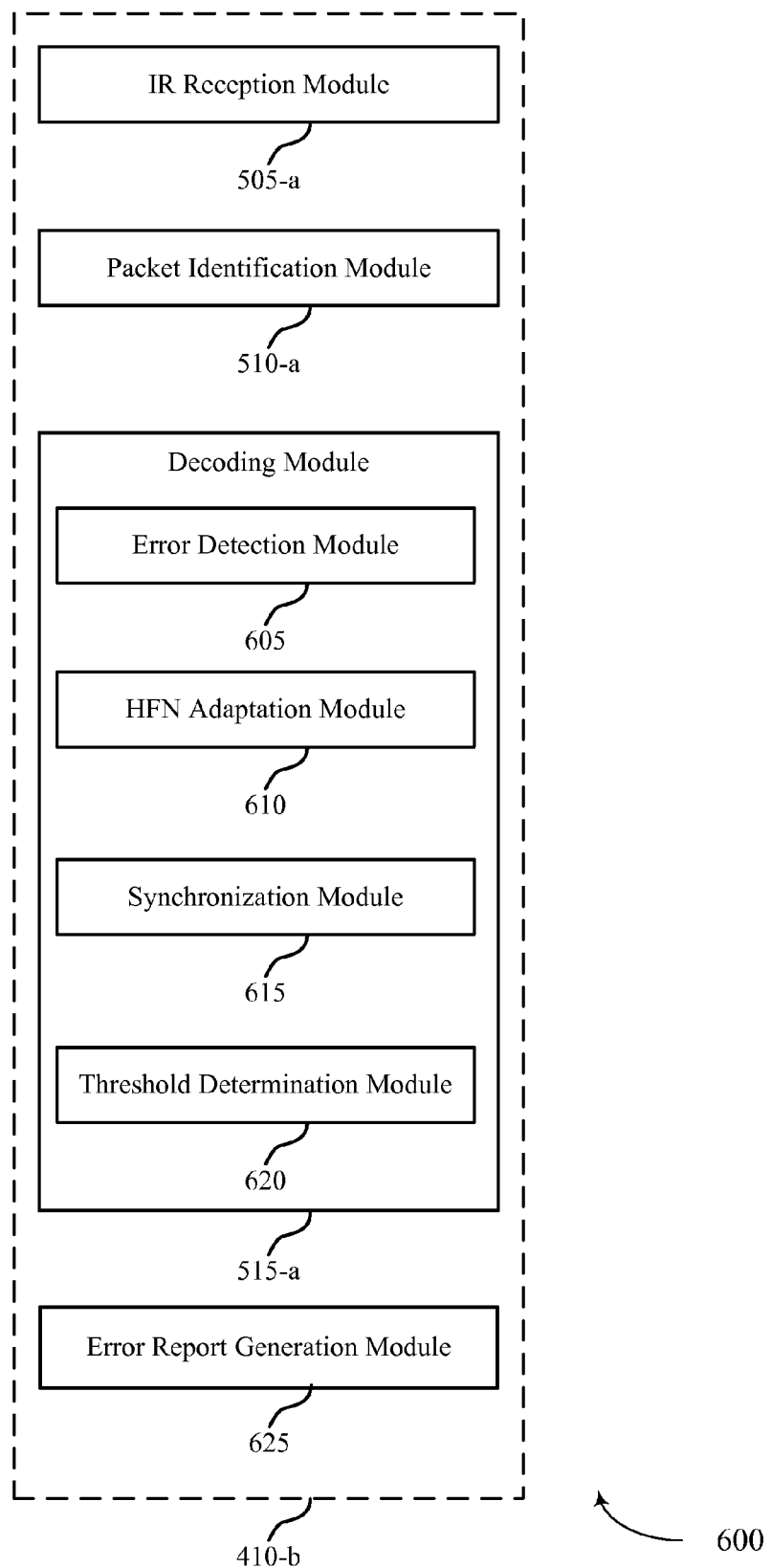
FIG. 6 shows a block diagram of a communication management module configured for synchronizing a UE with an HFN offset in accordance with various aspects of the present disclosure.

FIG. 6 shows a block diagram 600 of a communication management module 410-b for synchronizing UE with HFN offset in accordance with various aspects of the present disclosure. The communication management module 410-b may be an example of aspects of a communication management module 410 described with reference to FIGS. 4-5. The communication management module 410-b may include an IR reception module 505-a, a packet identification module 510-a, and a decoding module 515-a. Each of these modules may perform the functions described above with reference to FIG. 5. The communication management module 410-b may also include an error detection module 605, a HFN adaptation module 610, a synchronization module 615, a threshold determination module 620, and an error report generation module 625.

The components of the communication management module 410-b may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The error detection module 605 may determine that the IR packet is deciphered correctly based on a CRC value of the deciphered IR packet as described above with reference to FIGS. 2-3. The error detection module 605 may also detect a failure to decipher the IR packet correctly using the hyper frame number offset.

The HFN adaptation module 610 may increment a value of the hyper frame number offset based on the detected failure as described above with reference to FIGS. 2-3. Additionally or alternatively, the HFN adaptation module 610 may decrement a value of the hyper frame number offset based on the detected failure.

The synchronization module 615 may synchronize the first wireless device with the second wireless device based on a success in deciphering the IR packet using the hyper frame number offset as described above with reference to FIGS. 2-3.

The threshold determination module 620 may detect a threshold number of failures (e.g., consecutive failures) to decipher a compressed RoHC packet using a current hyper frame number stored by the first wireless device as described above with reference to FIGS. 2-3.

The error report generation module 625 may transmit an indication of the consecutive failures to the second wireless device as described above with reference to FIGS. 2-3. In some examples, the indication transmitted to the second wireless device comprises a negative acknowledgment message.

Figure 7:
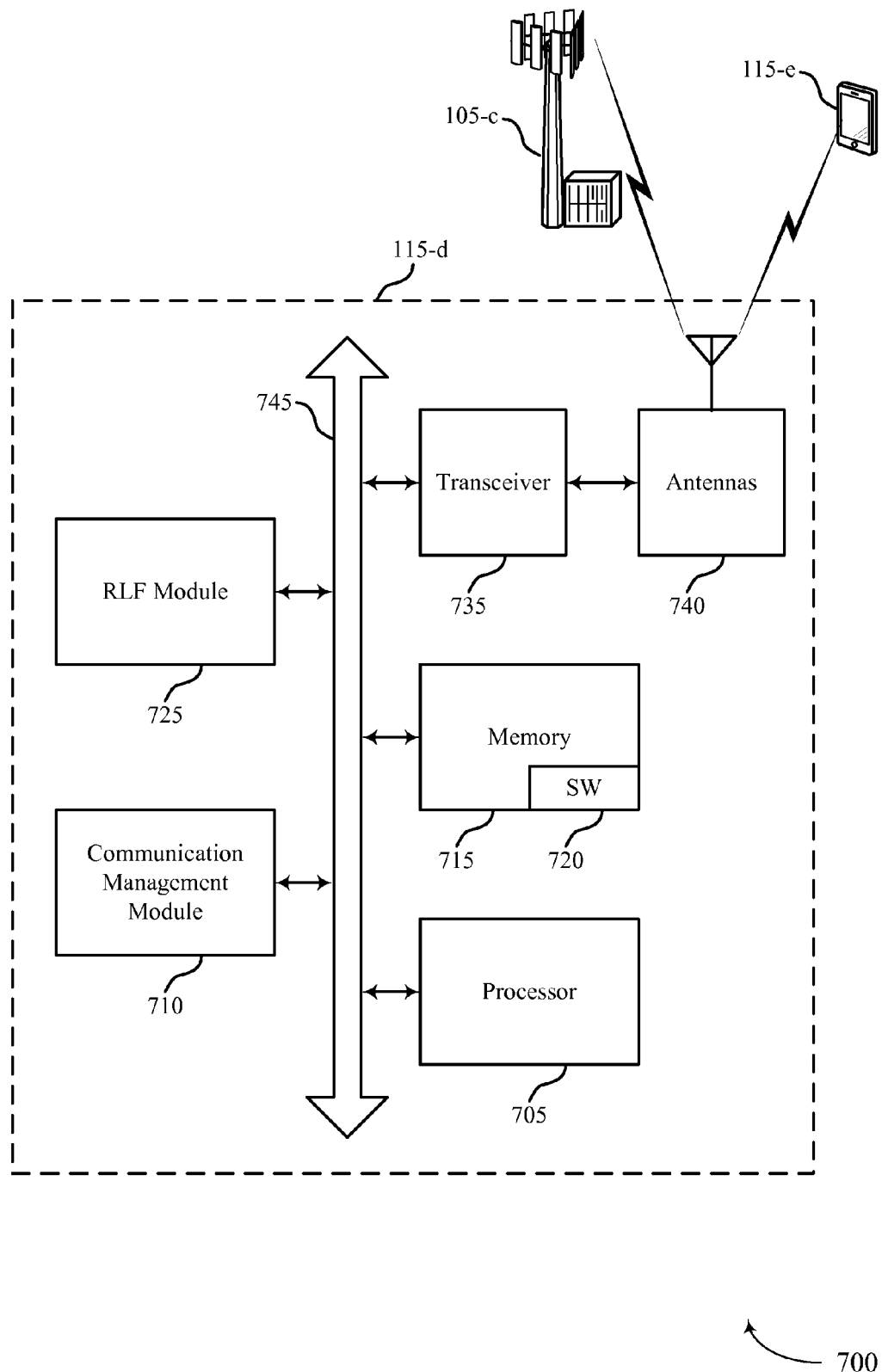
FIG. 7 illustrates a block diagram of a system including a UE configured for synchronizing the UE with an HFN offset in accordance with various aspects of the present disclosure.

FIG. 7 shows a diagram of a system 700 including a UE 115 configured for synchronizing a UE with an HFN offset in accordance with various aspects of the present disclosure. System 700 may include a UE 115-d, which may be an example of a UE 115 described above with reference to FIGS. 1-6. UE 115-e may include a communication management module 710, which may be an example of a communication management module 410 described with reference to FIGS. 4-6. UE 115-d may also include an RLF module 725. UE 115-d may also include components for bi-directional voice and data communications including components for transmitting communications and components for receiving communications. For example, UE 115-d may communicate bi-directionally with a UE 115-e or a base station 105-c.

The RLF module 725 may trigger a radio link failure based on the detected failure as described above with reference to FIGS. 2-3. For example, an RLF procedure may be triggered upon an RLC indication that a maximum number of retransmissions has been reached, upon receiving a maximum number of out-of-sync indications, or upon radio failure during a RACH procedure. In some cases (e.g., after reaching the limit for out-of-sync indications) the RLF module 725 may initiate a timer and wait to determine whether a threshold number (e.g., one or more) of in-sync indications are received. If the number of in-sync indications exceeds the threshold prior to expiration of the timer, the RLF module 725 may abort the RLF procedure. Otherwise, the RLF module 725 may perform a RACH procedure to regain access to network. The RACH procedure may include transmitting an RRC connection re-establishment request including the cell radio network temporary identity (C-RNTI), the cell identification (ID), security verification information, and a cause for re-establishment.

UE 115-d may also include a processor module 705, and memory 715 (including software (SW)) 720, a transceiver module 735, and one or more antenna(s) 740, each of which may communicate, directly or indirectly, with each other (e.g., via buses 745). The transceiver module 735 may communicate bi-directionally, via the antenna(s) 740 or wired or wireless links, with one or more networks, as described above. For example, the transceiver module 735 may communicate bi-directionally with a base station 105 or another UE 115. The transceiver module 735 may include a modem to modulate the packets and provide the modulated packets to the antenna(s) 740 for transmission, and to demodulate packets received from the antenna(s) 740. While UE 115-d may include a single antenna 740, UE 115-d may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor module 705 to perform various functions described herein (e.g., synchronizing UE with HFN offset, etc.). Alternatively, the software/firmware code 720 may not be directly executable by the processor module 705 but cause a computer (e.g., when compiled and executed) to perform functions described herein. The processor module 705 may include an intelligent hardware device, (e.g., a central processing unit (CPU), a microcontroller, an ASIC, etc.)

Figure 8:
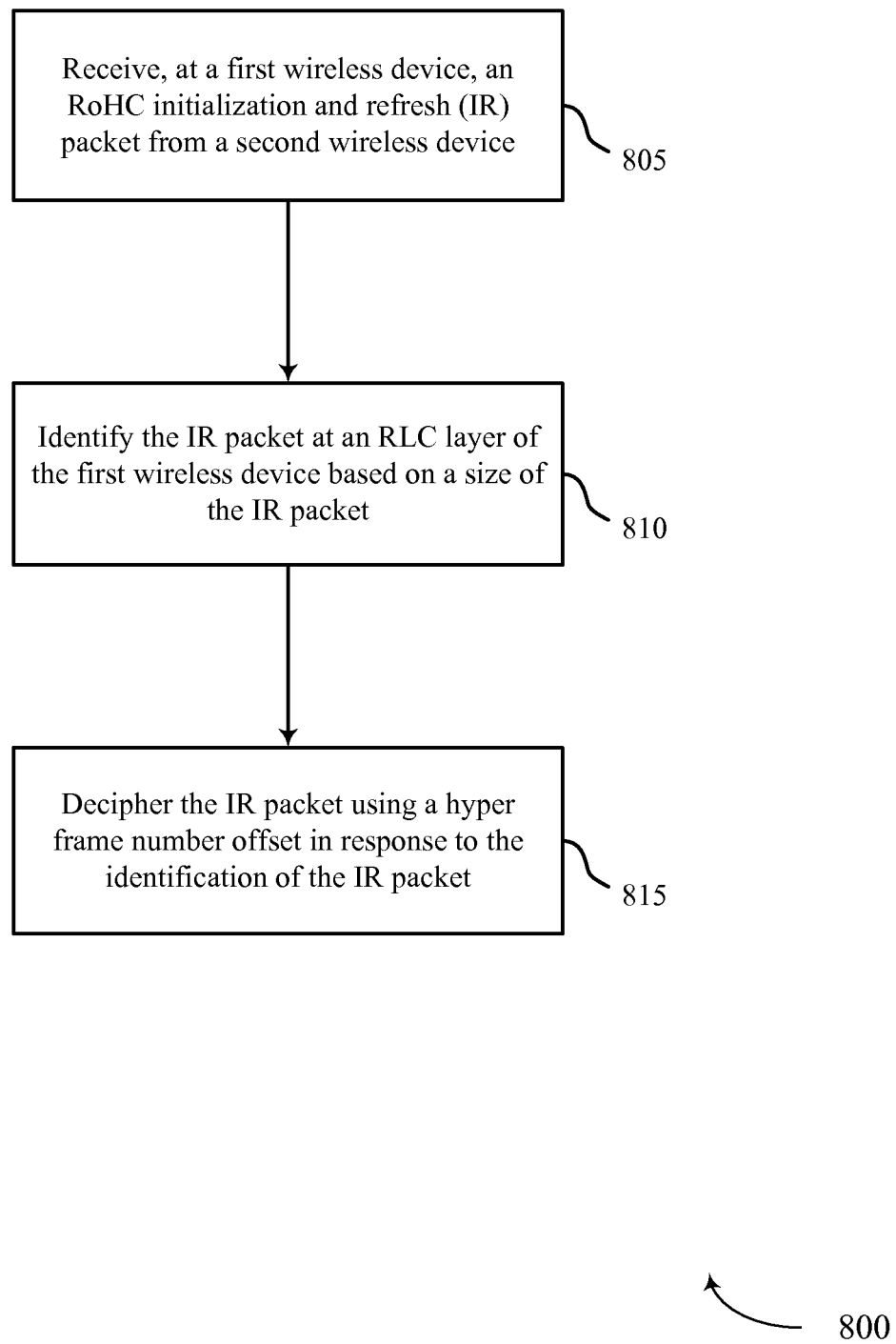
FIG. 8 shows a flowchart illustrating a method for synchronizing a UE with an HFN offset in accordance with various aspects of the present disclosure.

FIG. 8 shows a flowchart illustrating a method 800 for synchronizing a UE with an HFN offset in accordance with various aspects of the present disclosure. The operations of method 800 may be implemented by a UE 115 or its components as described with reference to FIGS. 1-7. For example, the operations of method 800 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware.

At block 805, the UE 115 may receive, at a first wireless device, an RoHC initialization and refresh (IR) packet from a second wireless device as described above with reference to FIGS. 2-3. In certain examples, the operations of block 805 may be performed by the IR reception module 505 as described above with reference to FIG. 5.

At block 810, the UE 115 may identify the IR packet at an RLC layer of the first wireless device based on a size of the IR packet as described above with reference to FIGS. 2-3. In aspects, the UE 115 may identify the IR packet at another layer. In certain examples, the operations of block 810 may be performed by the packet identification module 510 as described above with reference to FIG. 5.

At block 815, the UE 115 may decipher the IR packet using a hyper frame number offset in response to the identification of the IR packet as described above with reference to FIGS. 2-3. In certain examples, the operations of block 815 may be performed by the decoding module 515 as described above with reference to FIG. 5.

Figure 9:
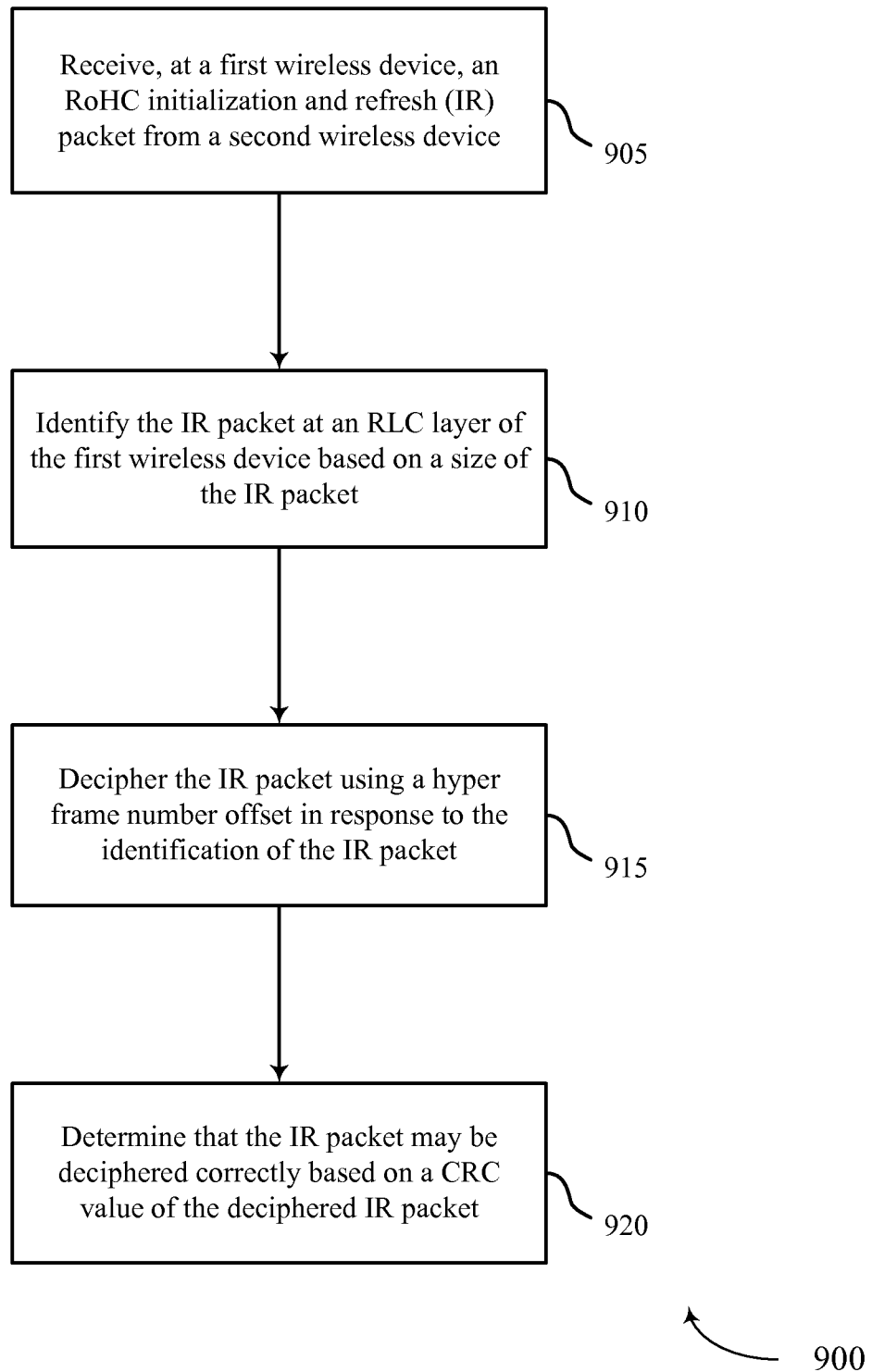
FIG. 9 shows another flowchart illustrating a method for synchronizing a UE with an HFN offset in accordance with various aspects of the present disclosure.

FIG. 9 shows a flowchart illustrating a method 900 for synchronizing a UE with an HFN offset in accordance with various aspects of the present disclosure. The operations of method 900 may be implemented by a UE 115 or its components as described with reference to FIGS. 1-7. For example, the operations of method 900 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 900 may also incorporate aspects of method 800 of FIG. 8.

At block 905, the UE 115 may receive, at a first wireless device, an RoHC initialization and refresh (IR) packet from a second wireless device as described above with reference to FIGS. 2-3. In certain examples, the operations of block 905 may be performed by the IR reception module 505 as described above with reference to FIG. 5.

At block 910, the UE 115 may identify the IR packet at an RLC layer of the first wireless device based on a size of the IR packet as described above with reference to FIGS. 2-3. In aspects, the UE 115 may identify the IR packet at another layer. In certain examples, the operations of block 910 may be performed by the packet identification module 510 as described above with reference to FIG. 5.

At block 915, the UE 115 may decipher the IR packet using a hyper frame number offset in response to the identification of the IR packet as described above with reference to FIGS. 2-3. In certain examples, the operations of block 915 may be performed by the decoding module 515 as described above with reference to FIG. 5.

At block 920, the UE 115 may determine that the IR packet is deciphered correctly based on a CRC value of the deciphered IR packet as described above with reference to FIGS. 2-3. In certain examples, the operations of block 920 may be performed by the error detection module 605 as described above with reference to FIG. 6.

Figure 10:
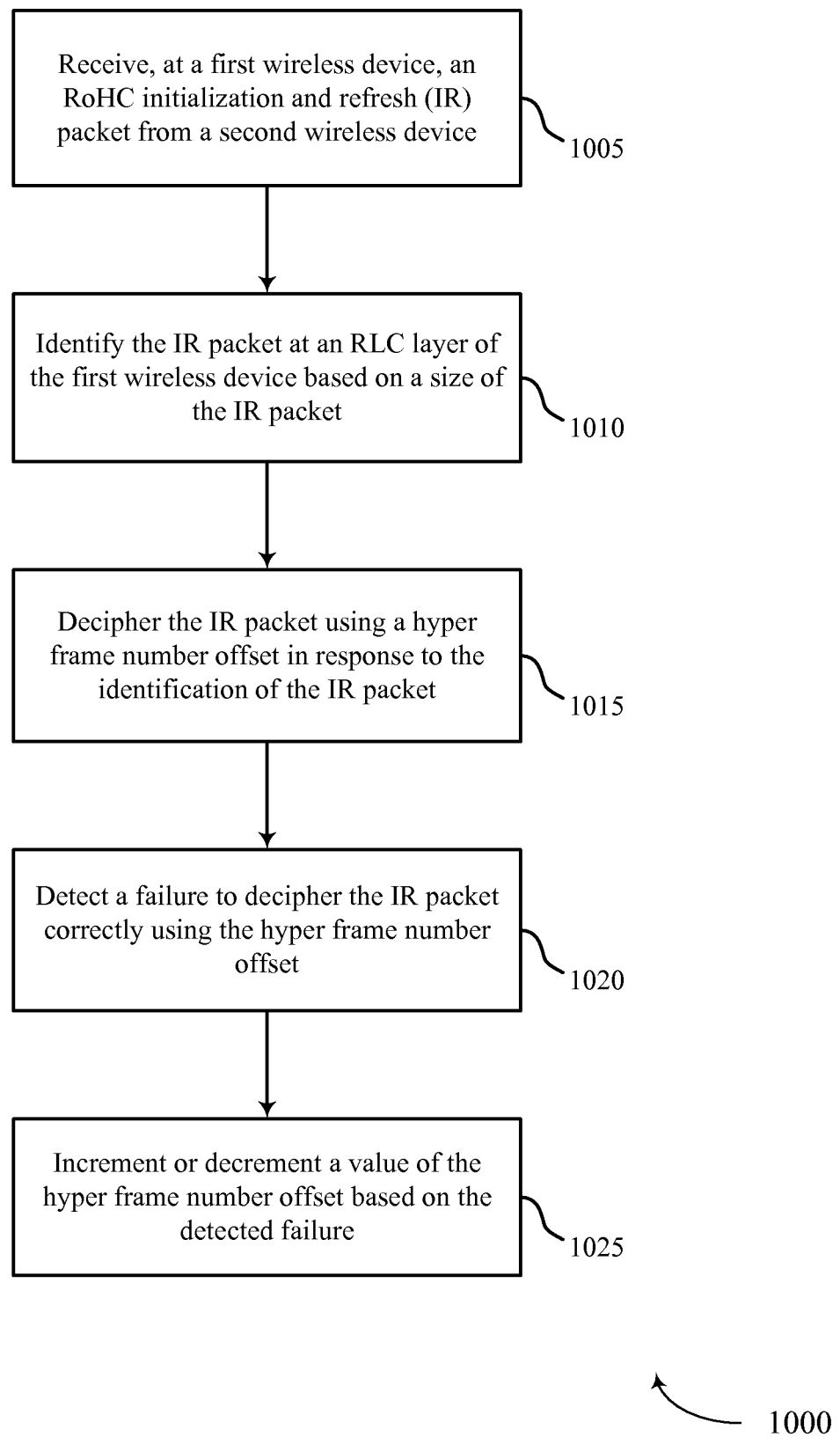
FIG. 10 shows another flowchart illustrating a method for synchronizing a UE with an HFN offset in accordance with various aspects of the present disclosure.

FIG. 10 shows a flowchart illustrating a method 1000 for synchronizing a UE with an HFN offset in accordance with various aspects of the present disclosure. The operations of method 1000 may be implemented by a UE 115 or its components as described with reference to FIGS. 1-7. For example, the operations of method 1000 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1000 may also incorporate aspects of methods 800, and 900 of FIGS. 8-9.

At block 1005, the UE 115 may receive, at a first wireless device, an RoHC initialization and refresh (IR) packet from a second wireless device as described above with reference to FIGS. 2-3. In certain examples, the operations of block 1005 may be performed by the IR reception module 505 as described above with reference to FIG. 5.

At block 1010, the UE 115 may identify the IR packet at an RLC layer of the first wireless device based on a size of the IR packet as described above with reference to FIGS. 2-3. In aspects, the the UE 115 may identify the IR packet at another layer. In certain examples, the operations of block 1010 may be performed by the packet identification module 510 as described above with reference to FIG. 5.

At block 1015, the UE 115 may decipher the IR packet using a hyper frame number offset in response to the identification of the IR packet as described above with reference to FIGS. 2-3. In certain examples, the operations of block 1015 may be performed by the decoding module 515 as described above with reference to FIG. 5.

At block 1020, the UE 115 may detect a failure to decipher the IR packet correctly using the hyper frame number offset as described above with reference to FIGS. 2-3. In certain examples, the operations of block 1020 may be performed by the error detection module 605 as described above with reference to FIG. 6.

At block 1025, the UE 115 may at least one of increment or decrement a value of the hyper frame number offset based on the detected failure as described above with reference to FIGS. 2-3. In certain examples, the operations of block 1025 may be performed by the HFN adaptation module 610 as described above with reference to FIG. 6.

Figure 11:
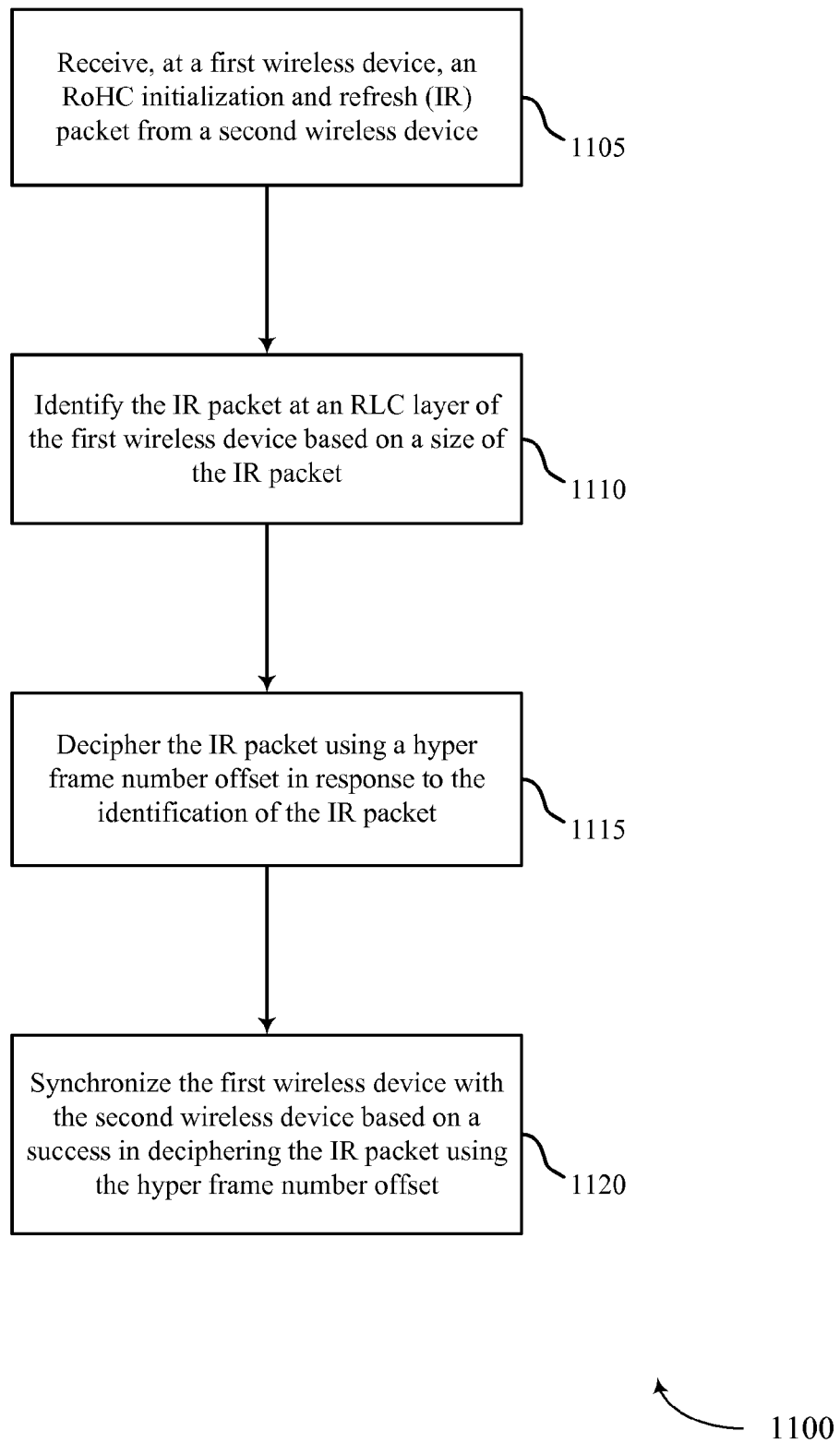
FIG. 11 shows another flowchart illustrating a method for synchronizing a UE with an HFN offset in accordance with various aspects of the present disclosure.

FIG. 11 shows a flowchart illustrating a method 1100 for synchronizing a UE with an HFN offset in accordance with various aspects of the present disclosure. The operations of method 1100 may be implemented by a UE 115 or its components as described with reference to FIGS. 1-7. For example, the operations of method 1100 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of methods 800, 900, and 1000 of FIGS. 8-10.

At block 1105, the UE 115 may receive, at a first wireless device, an RoHC initialization and refresh (IR) packet from a second wireless device as described above with reference to FIGS. 2-3. In aspects, the the UE 115 may identify the IR packet at another layer. In certain examples, the operations of block 1105 may be performed by the IR reception module 505 as described above with reference to FIG. 5.

At block 1110, the UE 115 may identify the IR packet at an RLC layer of the first wireless device based on a size of the IR packet as described above with reference to FIGS. 2-3. In certain examples, the operations of block 1110 may be performed by the packet identification module 510 as described above with reference to FIG. 5.

At block 1115, the UE 115 may decipher the IR packet using a hyper frame number offset in response to the identification of the IR packet as described above with reference to FIGS. 2-3. In certain examples, the operations of block 1115 may be performed by the decoding module 515 as described above with reference to FIG. 5.

At block 1120, the UE 115 may synchronize the first wireless device with the second wireless device based on a success in deciphering the IR packet using the hyper frame number offset as described above with reference to FIGS. 2-3. In certain examples, the operations of block 1120 may be performed by the synchronization module 615 as described above with reference to FIG. 6.

Figure 12:
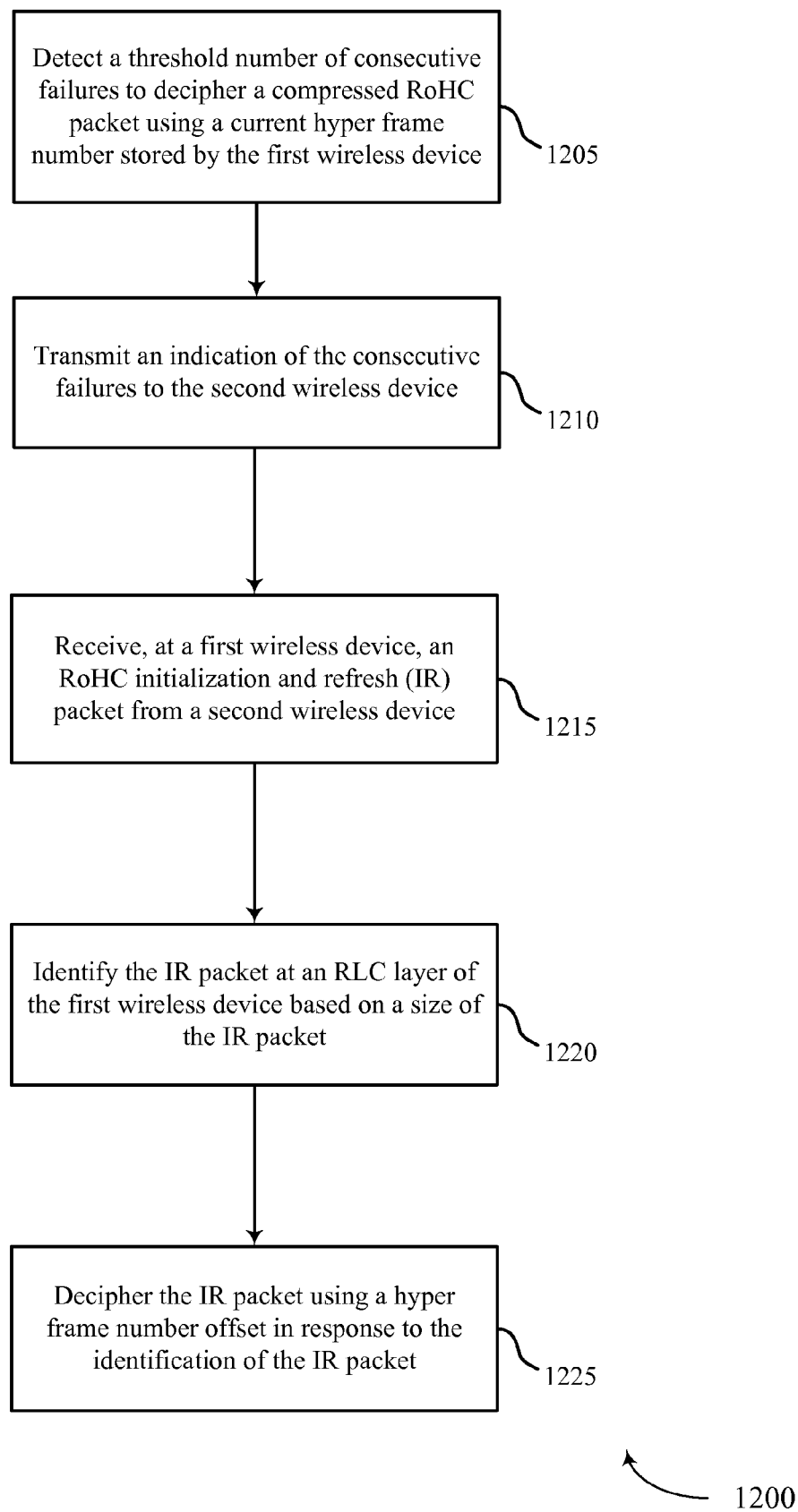
FIG. 12 shows another flowchart illustrating a method for synchronizing a UE with an HFN offset in accordance with various aspects of the present disclosure.

FIG. 12 shows a flowchart illustrating a method 1200 for synchronizing a UE with an HFN offset in accordance with various aspects of the present disclosure. The operations of method 1200 may be implemented by a UE 115 or its components as described with reference to FIGS. 1-7. For example, the operations of method 1200 may be performed by the communication management module 410 as described with reference to FIGS. 4-7. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 800, 900, 1000, and 1100 of FIGS. 8-11.

At block 1205, the UE 115 may detect a threshold number of consecutive failures to decipher a compressed RoHC packet using a current hyper frame number stored by the first wireless device as described above with reference to FIGS. 2-3. In certain examples, the operations of block 1205 may be performed by the threshold determination module 620 as described above with reference to FIG. 6.

At block 1210, the UE 115 may transmit an indication of the consecutive failures to the second wireless device as described above with reference to FIGS. 2-3. In certain examples, the operations of block 1210 may be performed by the error report generation module 625 as described above with reference to FIG. 6.

At block 1215, the UE 115 may receive, at a first wireless device, an RoHC initialization and refresh (IR) packet from a second wireless device as described above with reference to FIGS. 2-3. In certain examples, the operations of block 1215 may be performed by the IR reception module 505 as described above with reference to FIG. 5.

At block 1220, the UE 115 may identify the IR packet at an RLC layer of the first wireless device based on a size of the IR packet as described above with reference to FIGS. 2-3. In aspects, the the UE 115 may identify the IR packet at another layer. In certain examples, the operations of block 1220 may be performed by the packet identification module 510 as described above with reference to FIG. 5.

At block 1225, the UE 115 may decipher the IR packet using a hyper frame number offset in response to the identification of the IR packet as described above with reference to FIGS. 2-3. In certain examples, the operations of block 1225 may be performed by the decoding module 515 as described above with reference to FIG. 5.

Thus, methods 800, 900, 1000, 1100, and 1200 may provide for synchronizing a UE with an HFN offset. It should be noted that methods 800, 900, 1000, 1100, and 1200 describe possible implementation, and that the operations and the steps may be rearranged or otherwise modified such that other implementations are possible. In some examples, aspects from two or more of the methods 800, 900, 1000, 1100, and 1200 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving, at a first wireless device, a robust header compression (RoHC) initialization and refresh (IR) packet from a second wireless device;
   identifying the IR packet at a radio link control (RLC) layer of the first wireless device based on a size of the IR packet; and
   deciphering the IR packet using a hyper frame number offset in response to the identification of the IR packet.

2. The method of claim 1, wherein identifying the IR packet based on the size comprises:
   determining that the received IR packet comprises a larger ciphered protocol data unit (PDU) size than a compressed RoHC packet.

3. The method of claim 1, further comprising:
   determining that the IR packet is deciphered correctly based on a cyclic redundancy check (CRC) value of the deciphered IR packet.

4. The method of claim 1, further comprising:
   detecting a failure to decipher the IR packet correctly using the hyper frame number offset.

5. The method of claim 4, further comprising:
   incrementing a value of the hyper frame number offset based on the detected failure.

6. The method of claim 4, further comprising:
   decrementing a value of the hyper frame number offset based on the detected failure.

7. The method of claim 4, further comprising:
   triggering a radio link failure based on the detected failure.

8. The method of claim 1, further comprising:
   synchronizing the first wireless device with the second wireless device based on a success in deciphering the IR packet using the hyper frame number offset.

9. The method of claim 1, further comprising:
   detecting a threshold number of consecutive failures to decipher a compressed RoHC packet using a current hyper frame number stored by the first wireless device.

10. The method of claim 9, further comprising:
    transmitting an indication of the consecutive failures to the second wireless device.

11. The method of claim 10, wherein the indication transmitted to the second wireless device comprises a negative acknowledgment message.

12. An apparatus for wireless communication at a user equipment (UE), comprising:
    means for receiving, at a first wireless device, a robust header compression (RoHC) initialization and refresh (IR) packet from a second wireless device;
    means for identifying the IR packet at a radio link control (RLC) layer of the first wireless device based on a size of the IR packet; and
    means for deciphering the IR packet using a hyper frame number offset in response to the identification of the IR packet.

13. An apparatus for wireless communication at a user equipment (UE), comprising:
    a processor;
    memory in electronic communication with the processor; and
    instructions stored in the memory; wherein the instructions are executable by the processor to:
    receive, at a first wireless device, a robust header compression (RoHC) initialization and refresh (IR) packet from a second wireless device;
    identify the IR packet at a radio link control (RLC) layer of the first wireless device based on a size of the IR packet; and
    decipher the IR packet using a hyper frame number offset in response to the identification of the IR packet.

14. The apparatus of claim 13, wherein identifying the IR packet based on the size comprises:
    determining that the received IR packet comprises a larger ciphered protocol data unit (PDU) size than a compressed RoHC packet.

15. The apparatus of claim 13, wherein the instructions are further executable by the processor to:
    determine that the IR packet is deciphered correctly based on a cyclic redundancy check (CRC) value of the deciphered IR packet.

16. The apparatus of claim 13, wherein the instructions are further executable by the processor to:
  detect a failure to decipher the IR packet correctly using the hyper frame number offset.

17. The apparatus of claim 16, wherein the instructions are further executable by the processor to:
  increment a value of the hyper frame number offset based on the detected failure.

18. The apparatus of claim 16, wherein the instructions are further executable by the processor to:
  decrement a value of the hyper frame number offset based on the detected failure.

19. The apparatus of claim 16, wherein the instructions are further executable by the processor to:
  trigger a radio link failure based on the detected failure.

20. The apparatus of claim 13, wherein the instructions are further executable by the processor to:
  synchronize the first wireless device with the second wireless device based on a success in deciphering the IR packet using the hyper frame number offset.

21. The apparatus of claim 13, wherein the instructions are further executable by the processor to:
  detect a threshold number of consecutive failures to decipher a compressed RoHC packet using a current hyper frame number stored by the first wireless device.

22. The apparatus of claim 21, wherein the instructions are further executable by the processor to:
  transmit an indication of the consecutive failures to the second wireless device.

23. The apparatus of claim 22, wherein the indication transmitted to the second wireless device comprises a negative acknowledgment message.

24. A non-transitory computer-readable medium storing code for wireless communication at a user equipment (UE), the code comprising instructions executable to:
  receive, at a first wireless device, a robust header compression (RoHC) initialization and refresh (IR) packet from a second wireless device;
  identify the IR packet at a radio link control (RLC) layer of the first wireless device based on a size of the IR packet; and
  decipher the IR packet using a hyper frame number offset in response to the identification of the IR packet.

25. The non-transitory computer-readable medium of claim 24, wherein identifying the IR packet based on the size comprises:
  determining that the received IR packet comprises a larger ciphered protocol data unit (PDU) size than a compressed RoHC packet.

26. The non-transitory computer-readable medium of claim 24, wherein the instructions are further executable to:
  determine that the IR packet is deciphered correctly based on a cyclic redundancy check (CRC) value of the deciphered IR packet.

27. The non-transitory computer-readable medium of claim 24, wherein the instructions are further executable to:
  detect a failure to decipher the IR packet correctly using the hyper frame number offset.

28. The non-transitory computer-readable medium of claim 27, wherein the instructions are further executable to:
  increment a value of the hyper frame number offset based on the detected failure.

29. The non-transitory computer-readable medium of claim 27, wherein the instructions are further executable to:
  decrement a value of the hyper frame number offset based on the detected failure.

30. The non-transitory computer-readable medium of claim 27, wherein the instructions are further executable to:
  trigger a radio link failure based on the detected failure.

* * * * *